Figure 1:
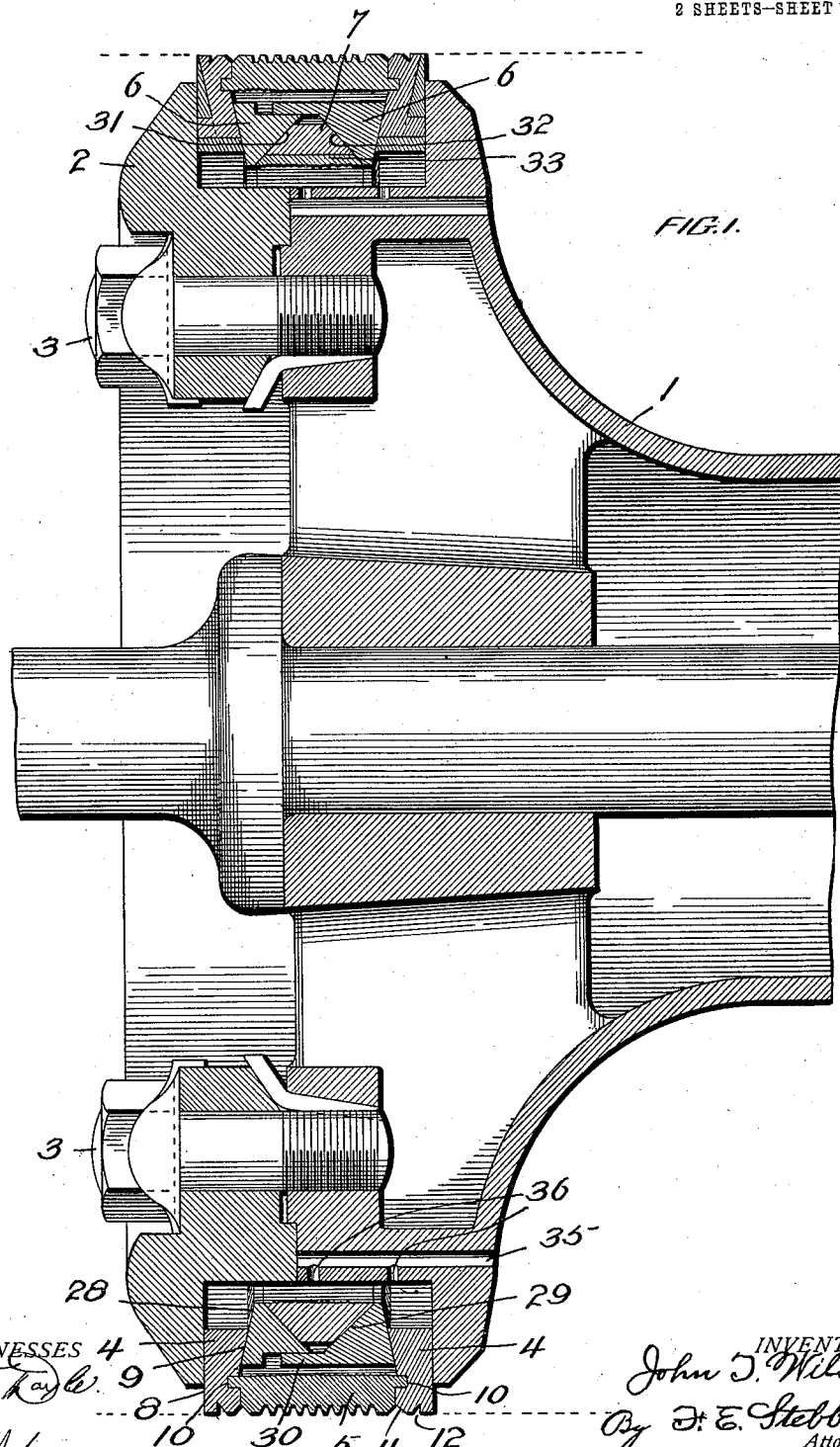

J. T. WILSON.
PISTON VALVE.
APPLICATION FILED NOV. 15, 1912.

1,072,682.

Patented Sept. 9, 1913.
2 SHEETS—SHEET 1.

WITNESSES

INVENTOR
John T. Wilson
By H. E. Stebbins
Attorney

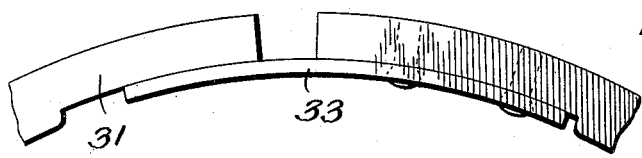
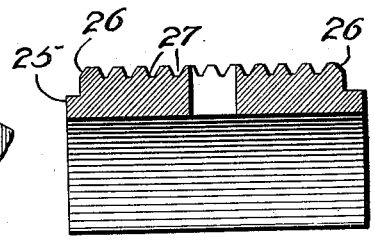
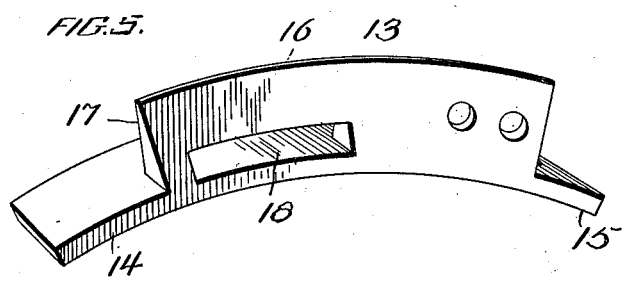
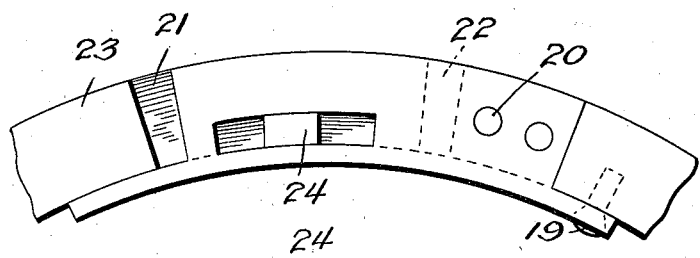
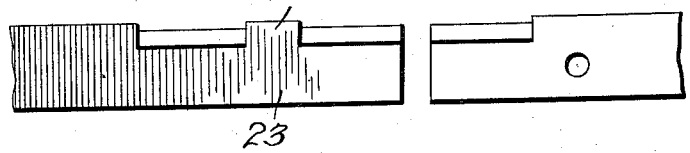
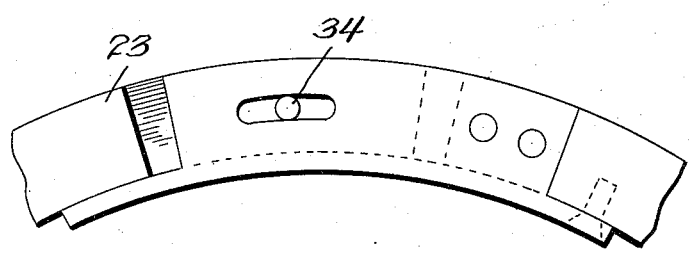

UNITED STATES PATENT OFFICE.

JOHN T. WILSON, OF JERSEY SHORE, PENNSYLVANIA.

PISTON-VALVE.

1,072,682. Specification of Letters Patent. Patented Sept. 9, 1913.

Application filed November 15, 1912. Serial No. 731,536.

*To all whom it may concern:*

Be it known that I, JOHN T. WILSON, a citizen of the United States, residing at Jersey Shore, in the county of Lycoming and State of Pennsylvania, have invented certain new and useful Improvements in Piston-Valves; and I do hereby declare the following to be a full, clear, and exact description of the invention, such as will enable others skilled in the art to which it appertains to make and use the same.

The packing rings of semi-plug piston valves are expanded by live steam admitted beneath the packing so that they will closely fit the valve cage, then the steam pressure locks and holds the rings in fixed positions until the steam pressure is removed when the packing rings contract. The successive expansions of the rings in repeated service compensate for the wear of the same by slightly increasing their diameters, and consequently, as no inspection is necessary, the rings are often continued in use until they are excessively worn away, when they break or are in danger of breaking.

One object of the present invention is the provision of means for positively limiting the expansion of the rings to a degree commensurate with the extreme amount of wear of the same which can be allowed with safety, so that when the predetermined limit of expansion has been reached subsequent wear of the rings cannot be taken up and so that steam will pass between the cage and the packing rings and give notice that the rings have been worn to the predetermined amount and that new rings must be substituted. Furthermore, packing rings as commonly constructed have their ends so relatively disposed to a so-called joint plate, which is generally connected to one end of a ring and overlaps the other end, as to allow a ring to expand and contract and at the same time maintain a steam-tight joint. In such constructions one end of a ring has been free to expand radially beyond the adjacent end, or the joint plate, and to prevent said end from such expansion the joint has been located opposite a bridge in the cage and means provided, as a dowel pin, to prevent the shifting of the ring relative to the axis of the valve and to one side of the bridge.

To improve this construction a further object of my invention is the provision of means for holding the adjacent ends of a ring in line so that one end cannot expand radially beyond the other, and so that the entire ring may shift or turn about the axis of the valve and adjust itself to the cage and thus insure an even wear of the same.

A further object is the construction and combination of the several rings of the packing in such a way that they will be locked in the recess within which they are normally disposed, and so that a packing ring cannot be dislodged and torn out, even should it be expanded to an excessive degree into a port.

With these ends in view, the invention consists, first, in certain novelties of construction and combinations of parts whereby the degree of expansion of each expansible packing ring is positively limited, the limit depending upon the degree of permissible wear of the exterior surface of the ring; secondly, in the provision of a joint plate connected to and uniting both ends of a packing ring so that said ends will positively be held in line under all degrees of expansion, and so neither end can expand into a port; thirdly, in so fashioning the integral wall rings of the combined packing that their movements toward each other will be limited, and preferably so that one wall ring will overlap the other.

The accompanying drawings illustrate embodiments of the improvements and disclose the best modes I have so far devised for the practical application of the principles.

Figure 1 is a vertical section in elevation of one end of a piston valve illustrating the elements constituting the packing, the section at the top being through the lap joints of the packing rings. Fig. 2 shows the lap joint of the wedge ring. Fig. 3 shows a cross section of the expansible wide ring and also its adjacent ends spaced apart. Fig. 4 shows in side elevation the lap joint of a packing ring as a whole. Fig. 5 is a view in perspective of the joint plate shown by Fig. 4. Fig. 6 is a bottom plan view of the adjacent ends of a packing ring, the joint plate being removed. Fig. 7 shows in side elevation a slightly modified construction of a packing ring lap joint.

The numeral 1 designates the spool and 2 the follower, both of which may be of any approved construction, detachably secured together by threaded studs 3. Between the circumferential flanges of the spool and follower is a circular recess, as shown, within which the packing as a whole is removably confined.

The packing comprises two expansible packing rings 4, an expansible wide ring 5, two integral non-expansible wall rings 6, and an expansible wedge ring 7. Each packing ring has a vertical surface 8, a beveled surface 9, a circumferential groove 10 in the beveled surface, an inner beveled edge 11, and a circumferential groove 12 in its exterior surface preferably defined by an outer vertical surface and an inner beveled surface or surface oblique to said vertical surface, the groove being located about three-sixteenths of an inch from the outer edge of the ring, as shown. Each ring is provided with a lap joint (see Figs. 4, 5 and 6) formed by a joint plate 13 having a base with ends 14, 15, a flange 16 with a beveled surface 17, and a slot 18. The surfaces of the ends of a packing ring are beveled to engage the beveled surface 17 of the joint plate flange and the joint plate is fixedly secured to one end of the packing ring by studs 19 and 20. The end 14 of the base movably bears against the under surface of one end of the packing ring and open spaces are provided at 21 and 22 to permit the expansion and contraction of the ring. The end 23 of the packing ring has a projecting lug 24 preferably integral with the metal of the ring, which is loosely seated within the slot 18 of the joint plate and within which slot it can move longitudinally to the desired degree to limit the expansion of the ring.

The expansible wide ring 5 (see Fig. 3) has tongues 25 loosely seated within the grooves 10 in the packing rings, beveled edges 26, and spaced circumferential grooves 27 in its outer surface. The adjacent ends of the ring are slightly separated, as shown. Each integral wall ring 6 has beveled surfaces 28, 29, and one of the rings has a flange 30 overlapping the other wall ring and limited in its travel toward said ring by a flange on the latter, as shown. The two wall rings are normally spaced apart the fraction of an inch, as illustrated by Fig. 1. The expansible wedge ring 7 (see Fig. 2) has beveled edges 31, 32 and its ends are spaced apart, the joint plate 33 being secured to one end of the ring and lapped beneath the other end to form a steam-tight joint.

The modified construction of joint shown by Fig. 7 has a pin or stud 34 fixedly seated within an opening in the free end 23 of the packing ring and its projecting end movably located within a slot in the joint plate, as illustrated.

The top and bottom sections of the packing shown by Fig. 1 clearly illustrate the relative reciprocal locations of the rings, the top section being taken through the lapped joints of the packing and wedge rings.

The mode of operation is as follows: Live steam, being admitted to the space between the flanges of the spool, passes to the under surfaces of the entire packing by way of the circumferential series of holes 35 and 36 in the spool. The packing rings 4, 4 and wide ring 5 are expanded by the steam pressure till their exterior surfaces are in contact with the interior surface of the cage, and the wedge ring 7 expanding forces the wall rings 6, 6 sidewise and apart against the beveled surfaces of the packing rings and locks and holds them in fixed positions until steam pressure is withdrawn, when the expansible rings slightly contract. As the exterior surfaces of the packing rings 4, 4 gradually wear away in repeated service, said rings will expand further and further, that is, successively increase their diameters, until the wall rings are moved toward each other so the flange 30 on one wall ring comes in contact with the flange upon the other wall ring. Further wear of the exterior surfaces of the packing rings, inasmuch as the wall rings in contact prevent further expansion of the packing rings, leaves an open space between the exterior surfaces of the packing rings and the inner surface of the cage through which live steam blows and indicates that the rings are worn to the predetermined limit. The means for limiting the degree of expansion of the packing rings as disclosed obviously consists of the wall ring with the flange 30 spaced apart the required distance from the other wall ring when the packing rings are new or unworn, and said wall rings are effective in attaining the desired end. However, other means may be employed for the same purpose, to wit: The joint plates of the packing rings may be provided with means for limiting their expansions, as herein set forth, each joint plate having a slot 18 and the end of a packing ring provided with a lug 24 or pin 34 movable within said slot the required distance, or equivalent means for the same purpose may be used.

Other analogous means may be employed in lieu of the foregoing described means for limiting the degrees of expansion of the packing rings without constituting substantial departures in the application of the principle. Obviously, the lug 24 or pin 34 located within the slot in a joint plate prevents the expansion of the otherwise free end of a packing ring into a port, and consequently the packing ring can turn about the axis of the valve and thus provide for an even wear of the cage.

The particular construction of the wall rings, one preferably having a flange overlapping the other, and their disposition relative to the other rings so that the travel of the one toward the other, or both toward each other, is limited, and the wedge shapes of the rings, prevents a packing ring from being displaced, inasmuch as the wall rings lock them within the recess formed between the flanges of the spool and follower.

From the foregoing description taken in connection with the drawings it becomes clear that I have produced a piston valve embodying improvements of construction and combinations of parts which are effective in attaining the modes of operation set forth as the objects of the invention.

What I claim is:

1. A piston valve having a packing comprising an expansible packing ring, and means for positively limiting the expansion of said ring to a degree corresponding to the permissible wear of the exterior surface of said ring and for holding the ends of the ring in line, said means consisting of a joint plate rigidly secured to one end of the said ring and said plate movably united to the opposite end of the ring by a slot and pin or lug connection, the pin or lug being located a distance from the end of the slot corresponding to the permissible wear of the exterior surface of the packing ring.

2. A piston valve having a packing comprising an expansible packing ring, means for admitting steam beneath the under surface of the packing ring to expand the same, and means for positively limiting the degree of expansion of the said packing ring and holding the ends of the ring in line, said means consisting of a projection on one end of the ring located and movable within a slot of the other end of the ring.

3. A piston valve having a packing comprising an expansible packing ring, one end of said ring being provided with a joint plate rigidly secured thereto and having a side slot therein, and the other end having a side projection located and movable within the said slot, the projection being so located within the slot that its distance from the outer end of the same will correspond to the predetermined amount of wear of the exterior surface of the packing ring.

4. A piston valve having a packing comprising two expansible packing rings, means for simultaneously admitting steam beneath the under surfaces of the rings to expand them, and means for positively limiting the degrees of expansion of the said rings and holding the ends of each ring in line, said means consisting of joint plates with slotted flanges and projecting lugs or pins.

5. A piston valve having a packing comprising two expansible packing rings each with a circumferential groove in its side surface, and an expansible ring with tongues at its side edges seated within the grooves in the sides of the packing rings; each of said packing rings being provided at its free ends with a slot and lug connection whereby the ends of a ring are held in line so neither end can expand into a port.

6. A piston valve having a packing comprising an expansible packing ring, an integral wall ring, an expansible wedge ring, and means for admitting steam beneath said rings to expand the packing and wedge rings; the packing ring having its ends united by a lug on one end of the ring movably seated within a slot in the other end of the ring.

7. A piston valve having a packing comprising two expansible packing rings, two integral wall rings one of which is provided with a flange, an expansible wedge ring, and means for admitting steam to the under surfaces of said rings.

8. A piston valve having a packing comprising two expansible packing rings each with a beveled surface, two integral wall rings each with two beveled surfaces, an expansible wedge ring, and means for admitting steam to the under surfaces of the rings; one of the wall rings having a flange overlapping the other wall ring, and the wall rings being so disposed relative to each other and to the packing rings that when said wall rings move into contact with each other the packing rings are prevented from further expansion.

9. A piston valve having a packing comprising two expansible packing rings each with a beveled surface, two integral wall rings each with two beveled surfaces and one having a flange 30, an expansible wedge ring, and means for admitting steam to the under surfaces of said rings.

10. A piston valve having a packing comprising two expansible packing rings each with a beveled side and with a groove therein, an expansible wide ring having tongues loosely seated within the grooves in the snap rings, two integral wall rings with beveled surfaces, one of said wall rings having a lug and the other a flange, an expansible wedge ring, and means for admitting steam beneath the packing.

11. A piston valve having a packing comprising two expansible packing rings each with a beveled side and with a groove therein, an expansible wide ring having tongues loosely seated within the grooves in the packing rings, two integral wall rings each having two beveled surfaces and one a flange overlapping the other, an expansible wedge ring, and means for admitting steam beneath the packing.

12. A piston valve having a packing comprising two expansible packing rings each with a beveled side and with a groove therein, an expansible wide ring having tongues loosely seated within the grooves in the packing rings, two integral wall rings each having two beveled surfaces and one of them a flange, an expansible wedge ring, means for admitting steam beneath the packing, and means for limiting the expansions of the packing rings and holding the ends of each in line.

13. A piston valve having a packing comprising two expansible packing rings each with a beveled side and with a groove therein, an expansible wide ring having tongues loosely seated within the grooves in the packing rings, two integral wall rings each having two beveled surfaces and one of them a flange overlapping the other wall ring, an expansible wedge ring, and means for admitting steam beneath the packing; the beveled surfaces of said rings being such that the packing rings cannot be forced or drawn from the recess in the valve within which said packing is located.

14. A piston valve having a packing comprised of a plurality of rings two of which are integral wall rings and one of the wall rings provided with a flange; and means for admitting steam beneath the packing.

In testimony whereof I affix my signature, in the presence of two witnesses.

JOHN T. WILSON.

Witnesses:
 W. B. HARLAN,
 A. J. FRANTZ.

---

Copies of this patent may be obtained for five cents each, by addressing the "Commissioner of Patents, Washington, D. C."